(12) United States Patent
Haritounian

(10) Patent No.: US 10,762,015 B2
(45) Date of Patent: Sep. 1, 2020

(54) SELF-CONFIGURING PERIPHERAL MODULE

(71) Applicant: Siemens Aktiengesellschaft, Munich (DE)

(72) Inventor: Sevan Haritounian, Karlsruhe (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 16/663,554

(22) Filed: Oct. 25, 2019

(65) Prior Publication Data
US 2020/0133906 A1 Apr. 30, 2020

(30) Foreign Application Priority Data

Oct. 26, 2018 (EP) .................................. 18202937

(51) Int. Cl.
| | |
|---|---|
| *G06F 13/372* | (2006.01) |
| *G06F 13/16* | (2006.01) |
| *G06F 13/42* | (2006.01) |
| *G06F 11/22* | (2006.01) |
| *G06F 11/30* | (2006.01) |

(52) U.S. Cl.
CPC .......... *G06F 13/372* (2013.01); *G06F 11/221* (2013.01); *G06F 11/3013* (2013.01); *G06F 13/1668* (2013.01); *G06F 13/4256* (2013.01)

(58) Field of Classification Search
None
See application file for complete search history.

(56) References Cited

U.S. PATENT DOCUMENTS

| | | |
|---|---|---|
| 5,848,609 A | 12/1998 | Marchesseault et al. |
| 2005/0151624 A1 | 7/2005 | Qualich et al. |
| 2014/0062540 A1 | 3/2014 | Deml et al. |

FOREIGN PATENT DOCUMENTS

| | | |
|---|---|---|
| EP | 2704326 | 3/2014 |

OTHER PUBLICATIONS

EP Search Report based on EP 18202937 dated May 10, 2019.

*Primary Examiner* — Idriss N Alrobaye
*Assistant Examiner* — Dayton Lewis-Taylor
(74) *Attorney, Agent, or Firm* — Cozen O'Connor

(57) ABSTRACT

A peripheral module of a programmable controller and method for operating the peripheral module, wherein in a calibration mode a base voltage value is supplied by the peripheral module to a terminal via a switching device, the supply potential is changed at a start time by the peripheral module to the modified value and a response time at which the expected change occurs is acquired, and the valid time interval is ascertained by the peripheral module utilizing the start time and the response time.

16 Claims, 6 Drawing Sheets

SELF-CONFIGURING PERIPHERAL MODULE

BACKGROUND OF THE INVENTION

1. Field of the Invention

The present invention relates to an operating method for a peripheral module of a programmable controller, where the peripheral module outputs, via a terminal of the peripheral module, a supply potential and, in this respect, an associated supply current to a field unit connected to the peripheral module, where, in a normal mode, the supply potential has a base voltage value and, in this respect, the supply current has a base current value, where the peripheral module changes over from time-to-time from normal mode into a test mode, in which the peripheral module changes the supply potential from the base voltage value to a modified voltage value by driving a switching device that is upstream of the terminal within the peripheral module for a defined valid time interval, checks whether, once the defined time interval has elapsed, an expected change has occurred due to the modification of the supply potential, changes back over into normal mode if the expected change occurs and changes over to an alarm mode if the expected change does not occur, where, in the alarm mode, the peripheral module outputs an alarm message to a central unit of the programmable controller and/or, via outputs of the peripheral module, transfers actuators connected to the peripheral module into a safe state, and where, during commissioning of the peripheral module, the peripheral module initially changes over prior to normal mode into a calibration mode.

The present invention furthermore relates to a peripheral module of a programmable controller, where the peripheral module has a terminal, via which the peripheral module outputs a supply potential and, in this respect, an associated supply current to a field unit connected to the peripheral module, where the peripheral module has a controller that is capable of operating the peripheral module at least in a normal mode, a test mode, an alarm mode and a calibration mode, where the controller operates the peripheral module in such a manner such that, in normal mode, the supply potential has a base voltage value and, in this respect, the supply current has a base current value, where the controller transfers the peripheral module from time-to-time from normal mode into test mode, where, in the test mode, the controller changes the supply potential from the base voltage value to a modified voltage value by driving a switching device which is upstream of the terminal within the peripheral module for a defined valid time interval, checks whether, once the defined time interval has elapsed, an expected change has occurred due to the modification of the supply potential, transfers the peripheral module back into the normal mode if the expected change occurs and transfers the peripheral module into the alarm mode if the expected change does not occur, wherein, in alarm mode, the controller outputs an alarm message to a central unit of the programmable controller and/or, via outputs of the peripheral module, transfers actuators connected to the peripheral module into a safe state, and wherein, during commissioning of the peripheral module, the controller initially operates the peripheral module in calibration mode prior to the normal mode.

2. Description of the Related Art

Various parameters often have to be set during the commissioning of peripheral modules of programmable controllers. In particular, in the case of fail-safe peripheral modules in comparison with non-fail-safe peripheral modules, additional parameters have to be set that are not required for non-fail-safe peripheral modules.

For example, in order to increase operational reliability and detect in good time any errors that do occur, many safe peripheral modules check themselves from time-to-time. The cycle time between two such checks may be predetermined for the peripheral module by an operator. It is generally in the region of some seconds or often also longer in the region of minutes, hours or days.

During the actual testing, it must be distinguished whether the field unit connected to the terminal is an actuator or a sensor.

In the case of an actuator, the supply potential applied to the terminal in normal mode is the base voltage value. It must, however, be checked whether, in the event of a change in the supply potential to the modified voltage value, thus if the actuator is to be switched over, the actuator responds accordingly. It must at least be checked whether the modified voltage value is actually applied at the output. In order to be able to perform this check, the operator must, on the one hand, specify the base voltage value and the modified voltage value. Furthermore, in the prior art, the operator must also specify the time interval for which the modified voltage value is to be applied to the output. This is because, depending the specific configuration, such as the nature of the actuator, its inductance, its capacitance and in particular the length of the connecting leads from the terminal to the actuator, it may take a differing amount of time until driving of the upstream switching device actually causes a measurable change in the supply potential from the base voltage value to the modified voltage value, a change in current flow and/or a response from the actuator.

While it is indeed possible to specify the time interval with a maximum possible value (for example 2 seconds) and so set a fixed time interval, this would, however, result in the modified voltage value being output to the actuator for an appreciable time interval that is often much too long for an individual case. In particular, it would often result in the actuator actually responding to the change in the supply potential. The time interval should therefore be as short as possible. In the case of a relatively sluggish actuator, a brief changeover from the base voltage value to the modified voltage value may indeed, on the one hand, be measured, such that it may be checked that the upstream switching device is functioning properly. On the other hand, due to the sluggishness of the actuator, it may for example happen that the actuator has not yet even responded during the defined time interval. In this way, the upstream switching device can be checked without the actuator actually responding. Even if the actuator actually responds, the effect on the controlled process is nevertheless often sufficiently small provided the time interval is also sufficiently short.

In the case of a sensor, the supply potential applied to the terminal in normal mode is always the base voltage value. It must, however, be checked whether the sensor is capable of responding appropriately to the signal it is to acquire. In order to be able to perform this check, in the prior art the operator must also specify the time interval for which the modified voltage value is to be applied to the output. This is because, depending the specific configuration, such as the nature of the sensor, its inductance, its capacitance and in particular the length of the connecting leads from the terminal to the sensor, it may take a differing amount of time until driving of the upstream switching device actually causes a measurable change in the supply potential from the base voltage value to the modified voltage value, a change in current flow or a response from the sensor.

Here, it is also possible to specify the time interval with a maximum possible value (for example, 2 seconds) and so set a fixed time interval. This would, however, result in the modified voltage value being output to the sensor for an appreciable time interval that is often much too long for an individual case. In particular, this would often result in the sensor itself not being able to respond during this time interval to the signal it is actually intended to acquire. The time interval should therefore be as short as possible.

In many cases, the operator has access to datasheets or the like, on the basis of which the operator can determine or at least limit the time interval. However, as has already been mentioned, the time interval is in particular also dependent on the length of the connecting leads between the terminal and the field unit. In particular, this length is most generally not known in advance. Even if datasheets or the like are available, the operator therefore often has to perform repeated tests to establish what value he/she should appropriately set for the time interval. This procedure is, on the one hand, time-consuming and thus also costly and, on the other hand, error-prone.

SUMMARY OF THE INVENTION

In view of the foregoing, it is accordingly an object of the present invention to provide options via which the commissioning of a peripheral module is simplified and in particular the necessary time interval can be automatically and reliably ascertained and determined.

This and other objects and advantages are achieved in accordance with the invention by an operating method in which, in calibration mode, the peripheral module initially supplies a base voltage value to a terminal via a switching device, then, at a start time, changes the supply potential to a modified value and acquires a response time at which an expected change occurs, and finally, using a start time and a response time, ascertains a valid time interval.

As a result, the operator is liberated from the often laborious and time-consuming task of correctly and in particular optimally determining the time interval.

The expected change may be determined in various manners. For example, it is possible, at least in test mode, for the supply potential and/or supply current to be acquired. Here, the expected change may be a change in the supply potential and/or in the supply current.

It is alternatively possible for the peripheral module, at least in test mode, to receive a state of the field unit via a further terminal. Here, the expected change may be a change in the state of the field unit.

These two developments can be implemented both if the field unit takes the form of an actuator and if the field unit takes the form of a sensor.

In those cases in which the field unit takes the form of an actuator, it is furthermore possible, for the peripheral module to output a further supply potential to the field unit via a further terminal of the peripheral module, such that the supply current output to the field unit is returned to the peripheral module from the field unit via the further terminal, and for the expected change to be a change in the further supply potential.

In calibration mode, the peripheral module preferably in each case repeatedly supplies the base voltage value, modifies the supply potential and acquires the start time and response time and to this end in each case ascertains a provisional time interval. This makes it possible for the peripheral module to ascertain the valid time interval by statistical evaluation of the provisional time intervals. This procedure improves the accuracy and reliability of the valid time interval ascertained by the peripheral module.

In the case of the procedure being repeatedly performed with a provisional time interval being ascertained in each case, it is furthermore possible for the peripheral module only to determine the valid time interval to be valid if a scatter of the provisional time intervals meets a predetermined condition and otherwise to output a report to a higher-level control device and/or to an operator. In this way, it is possible to reliably rule out in particular incorrect determinations that might, in subsequent operation of the peripheral module, result either in frequent triggering of false alarms or in unacceptable non-detection of error states.

It is also an object of the invention to provide a peripheral module in which, in calibration mode, the controller initially supplies a base voltage value to a terminal via a switching device, then, at a start time, by driving the switching device upstream of the terminal, changes the supply potential to a modified value and acquires a response time at which the expected change occurs, and finally, using the start time and the response time, ascertains the valid time interval.

The advantages achievable thereby correspond to those of the operating method.

The advantageous developments of the peripheral module correspond to the advantageous developments of the operating method. The same applies to the advantages in each case achieved thereby.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The above-described characteristics, features and advantages of this invention and the manner in which these are achieved will become clearer and more distinctly comprehensible from the following description of the exemplary embodiments, which are explained in greater detail with reference to the drawings, in which.

DETAILED DESCRIPTION OF THE EXEMPLARY EMBODIMENTS

Figure 1:
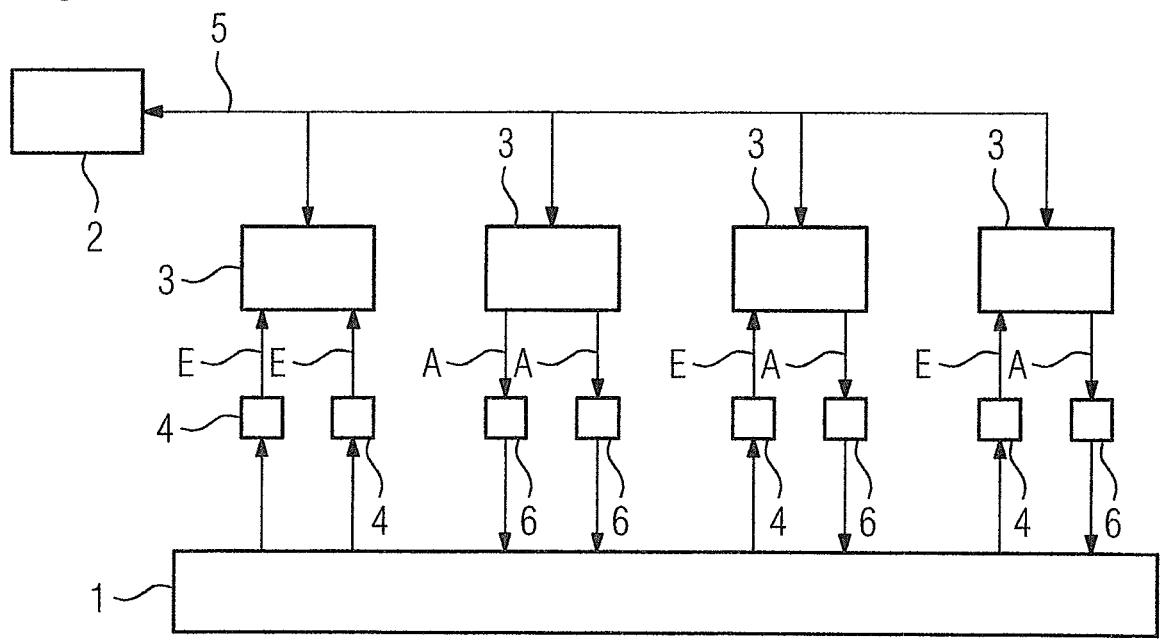
FIG. 1 shows a schematic illustration of a technical industrial process and a programmable controller in accordance with the invention.

As shown in FIG. 1, a technical industrial process 1 is controlled or at least partially controlled via a programmable controller. The technical industrial process 1 may in principle be of any desired nature. The programmable controller has a central unit 2 and peripheral modules 3. The peripheral modules 3 receive input variables E from the process 1 via sensors 4 and relay them, for example, via a bus system 5, to the central unit 2. The sensors 4 may, for example, be emergency stop switches. They may, however, also be other sensors. The central unit 2, taking account of the input variables E transferred thereto, ascertains output variables A for the process 1 and outputs them, for example, via the bus system 5, to the peripheral modules 3. The peripheral modules 3 thereupon accordingly drive actuators 6, via which the process 1 is influenced. The actuators 6 may, for example, control a power supply of the process 1. Other actions are, however, also possible. The sensors 4 and the actuators 6 are field units for the purposes of the present invention.

Operation of an individual one of the peripheral modules 3 is explained in greater detail below. Here, it is assumed that the explained peripheral module 3 is a "mixed" input/output module, i.e., a module that not only receives input variables E from sensors 4 and transfers them to the central unit 2 but also receives output variables A from the central unit 2 and drives actuators 6 accordingly. It would, however, in principle likewise be possible for the peripheral module 3 to be purely an input module or purely an output module, thus a module that either exclusively receives input variables E from sensors 4 and transfers them to the central unit 2 or exclusively receives output variables A from the central unit 2 and drives actuators 6 accordingly. Furthermore, in each case only the procedure with respect to one individual sensor 4 and one individual actuator 6 is explained. It should be understood the explained procedures may also be applied to a plurality of sensors 4 and/or a plurality of actuators 6.

Figure 2:
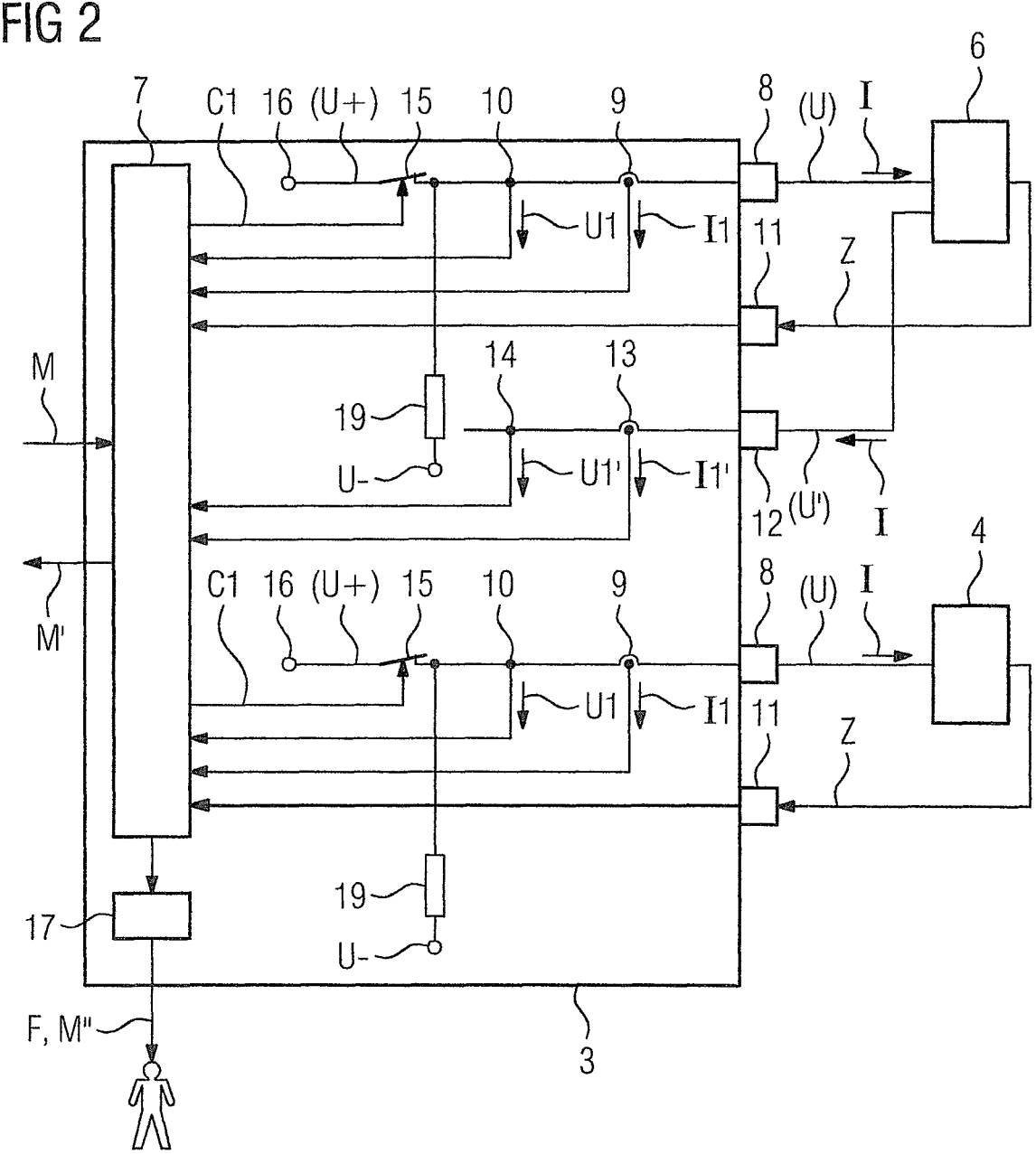
FIG. 2 shows a schematic illustration of a peripheral module in accordance with the invention.

As shown in FIG. 2, the peripheral module 3 has a controller 7. The controller 7 is, on the one hand, the device that communicates with the central unit 2. The controller 7 is, on the other hand, the device which controls the other elements of the peripheral module 3.

The peripheral module 3 has a terminal 8 for each actuator 6 and for each sensor 4 that is connected to the peripheral module 3. The peripheral module 3 outputs a supply potential U to one of the actuators 6 or one of the sensors 4 via the respective terminal 8. In this regard, an associated respective supply current I flows that is likewise output to the respective actuator 6 or the respective sensor 4. For the purposes of the development of FIG. 2, the supply potential U and/or the supply current I may be acquired via corresponding respective acquisition devices 9, 10 and corresponding measured values U1, I1 supplied to the controller 7.

In the case of actuators 6, it is possible for the respective actuator 6 to be connected to the peripheral module 3 exclusively via the stated respective terminal 8. This is also the normal situation.

In the case of sensors 4, the peripheral module 3 receives a state Z of the respective sensor 4 via a respective further terminal 11. This is likewise possible, but not necessarily required, in the case of actuators 6. In the event of the respective state Z being fed back, the respective state Z is likewise supplied to the controller 7.

In the case of actuators 6, it is furthermore possible for the peripheral module 3 to output a further supply potential U' to the respective actuator 6 via a respective further terminal 12. Here, the respective supply current I output to the respective actuator 6 (via the respective terminal 8) is returned via the respective further terminal 12 to the peripheral module 3. It is therefore, on the one hand, possible, via a respective further acquisition device 13, to likewise acquire the respective supply current I and supply it as a corresponding measured value I1' to the controller 7. This acquisition generally proceeds as an alternative to the acquisition of the respective supply current I by the acquisition device 9. It is, on the other hand, possible, via a respective acquisition device 14, to acquire the respective further supply potential U' and supply it as a corresponding measured value U1' to the controller 7. This acquisition generally proceeds in addition to the acquisition of the respective supply potential U by the respective acquisition device 10.

Figure 3:
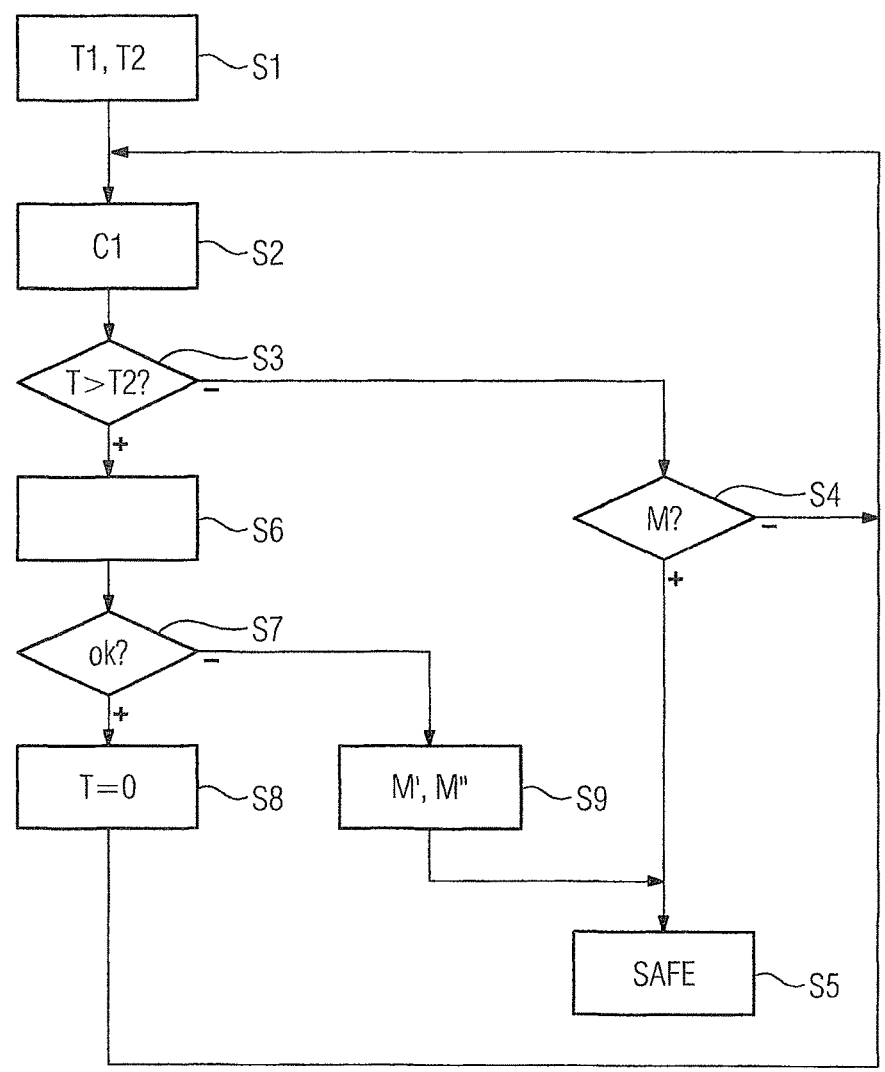
FIG. 3 shows a flowchart of the method and in accordance with the invention.

FIG. 3 is a flowchart illustrating the steps of how the controller 7 operates the peripheral module 3. The corresponding explanations in each case apply individually to an individual actuator 6 or an individual sensor 4.

In a step S1, the controller 7 initially operates the peripheral module 3 in a calibration mode during commissioning of the peripheral module 3. A time interval T1 is in particular determined in calibration mode. A cycle time T2 is generally furthermore also determined. Calibration mode and in particular the determination of the time interval T1 are explained in greater detail further below.

The controller 7 then operates the peripheral module 3 in a normal mode in a step S2. In normal mode, the controller 7 in particular outputs a respective control signal C1 to a respective switching device 15. The switching device 15 is upstream of the respective terminal 8 within the peripheral module 3. The respective switching device 15 is driven appropriately such that the respective supply potential U has a base voltage value, such as the value U+, in normal mode. In this regard, the respective supply current I has a respective base current value I0.

In a step S3, the controller 7 checks whether an accumulated time T has reached (or exceeded) the cycle time T2. The cycle time T2 is often in the region of some seconds, sometimes even in the region of minutes or hours. If the cycle time T2 has not yet been reached, the controller 7 moves on to a step S4. In step S4, the controller 7 checks whether an alarm message M has been transferred by the central unit 2. If such is the case, then the controller 7 moves on to a step S5. Step S5 corresponds to an alarm mode of the peripheral module 3. In step S5, the controller 7 transfers the actuators 6 connected to the peripheral module 3 into a safe state. For example, the controller 7 can shut down power supplies 16, via which the actuators 6 are supplied with electrical energy, and/or isolate them from the actuators 6. With regard to the actuator 6 shown in FIG. 2, the controller 7 may in step S5, for example, open the switching device 15 and/or shut down the upstream power supply 16. If, in step S4, the controller 7 detects that no alarm message M has been transferred to it, the controller 7 returns to step S2.

If the accumulated time T has reached or exceeded the cycle time T2, then the controller 7 moves on from step S3 to a step S6. Step S6 corresponds to a test mode of the peripheral module 3. The test mode is explained in greater detail further below. In a step S7, the controller 7 checks whether it has been possible to bring the test mode to a proper conclusion. If such is the case, the controller 7 terminates the test mode and, via a step S8, moves back again to step S2 and thus to normal mode. In step S8, the controller 7 resets the accumulated time T.

Otherwise, the controller 7 moves on to a step S9. Step S9 is already part of alarm mode. In step S9, the controller 7 may output an alarm message M' to the central unit 2. Alternatively or additionally, the controller 7 may in step S9 output an alarm message M'' to an operator 18 via a human-machine interface 17. The alarm message M" may in particular comprise an optical signal and/or an acoustic signal.

Figure 4:
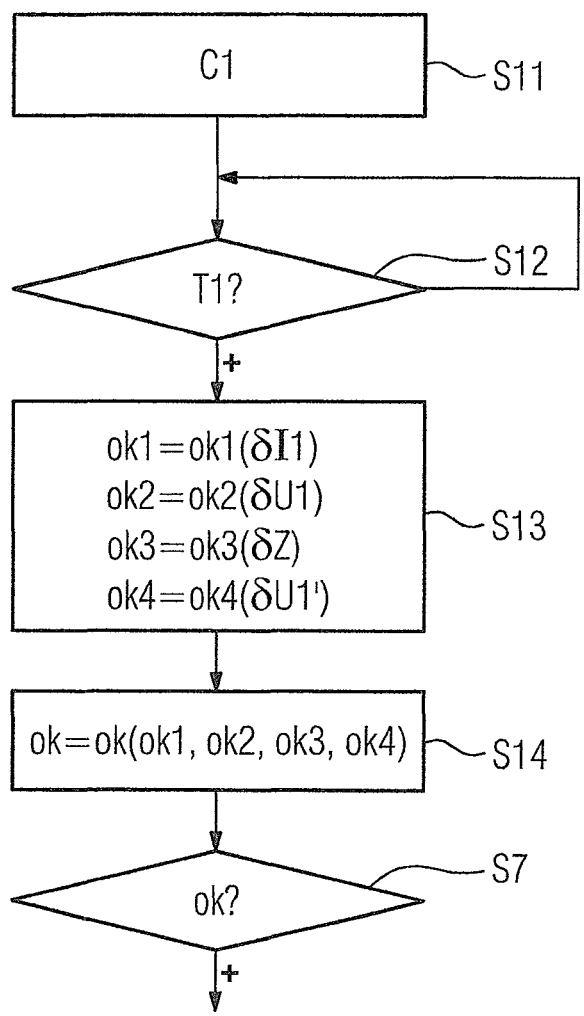
FIG. 4 shows a further flowchart of the method in accordance with an embodiment of the invention.

FIG. 4 is a flowchart of the steps associated with test mode. As shown in FIG. 4, in test mode, the controller 7 drives the respective switching device 15 in a step S11. For example, if the respective switching device 15 is closed in normal mode, then the controller 7 can drive the respective switching device 15 in step S11 such that it is opened. Independently of the specific manner in which the respective switching device 15 is driven, driving of the respective switching device 15 causes a change in the respective supply potential U from the respective base voltage value U+ to a respective modified voltage value, hereinafter provided with the reference sign U−. For example, a corresponding resistor 19 may be present, via which the respective terminal 8, with the respective switching device 15 open, is supplied with the modified voltage value U− at high resistance. Embodiments are, however, also possible in which the resistor 19 is not necessary, for example, in the case of a respective actuator 6 being supplied with the further supply potential U' or in the case of deliberate (intentional) shorting to earth or ground on the part of the respective actuator 6 or sensor 4.

In a step S12, the controller 7 then waits for the time interval T1 to elapse. Waiting for the time interval T1 is necessary because, due to capacitances and/or inductances of the connected actuator 6 or sensor 4 and/or of the leads from the respective terminal 8 to the respective actuator 6 or sensor 4 (and optionally back to one or both of terminals 11, 12), the effect arising from driving the respective switching device 15 will only be perceptible after a certain delay.

Once the time interval T1 has elapsed, the controller 7 checks in a step S13 whether an expected change has occurred due to the modification of the supply potential U. For example, as shown in FIG. 4, the controller 7 may check in step S13 whether the supply potential U and/or the supply current I have changed sufficiently. This is indicated in step S13 in that the controller 7 ascertains corresponding logical variables ok1, ok2 as a function of the change δU in the respective supply potential U or the change δI in the respective supply current I. It should be understood ascertaining the logical variables ok1, ok2 entails prior corresponding acquisition via the corresponding acquisition devices 9, 10 or 10, 13. It is alternatively or additionally possible for the controller 7 to check in step S13 whether the state Z of the respective actuator 6 or of the respective sensor 4 has changed. This is indicated in step S13 in that the controller 7 ascertains a corresponding logical variable ok3 as a function of the change δZ in state Z. It should be understood ascertaining the logical variable ok3 entails prior corresponding feedback of the state Z to the peripheral unit 3. In the case of an actuator 6, the controller 7 may furthermore ascertain a logical variable ok4 based on a change δU' in the respective further supply potential U'.

In a step S14, the controller 7 may ascertain a resultant logical variable ok, for example, based on the logical variable ok1 and/or the logical variable ok2 and/or the logical variable ok3 and/or the logical variable ok4. The logical variable ok assumes the value TRUE if the expected change has occurred. Otherwise, the logical variable ok assumes the value FALSE. The value of the logical variable ok thus decides whether the controller 7 changes over from the following step S7 to alarm mode (steps S9 and S5, FIG. 3) or to normal mode (step S2, FIG. 3).

Figure 5:
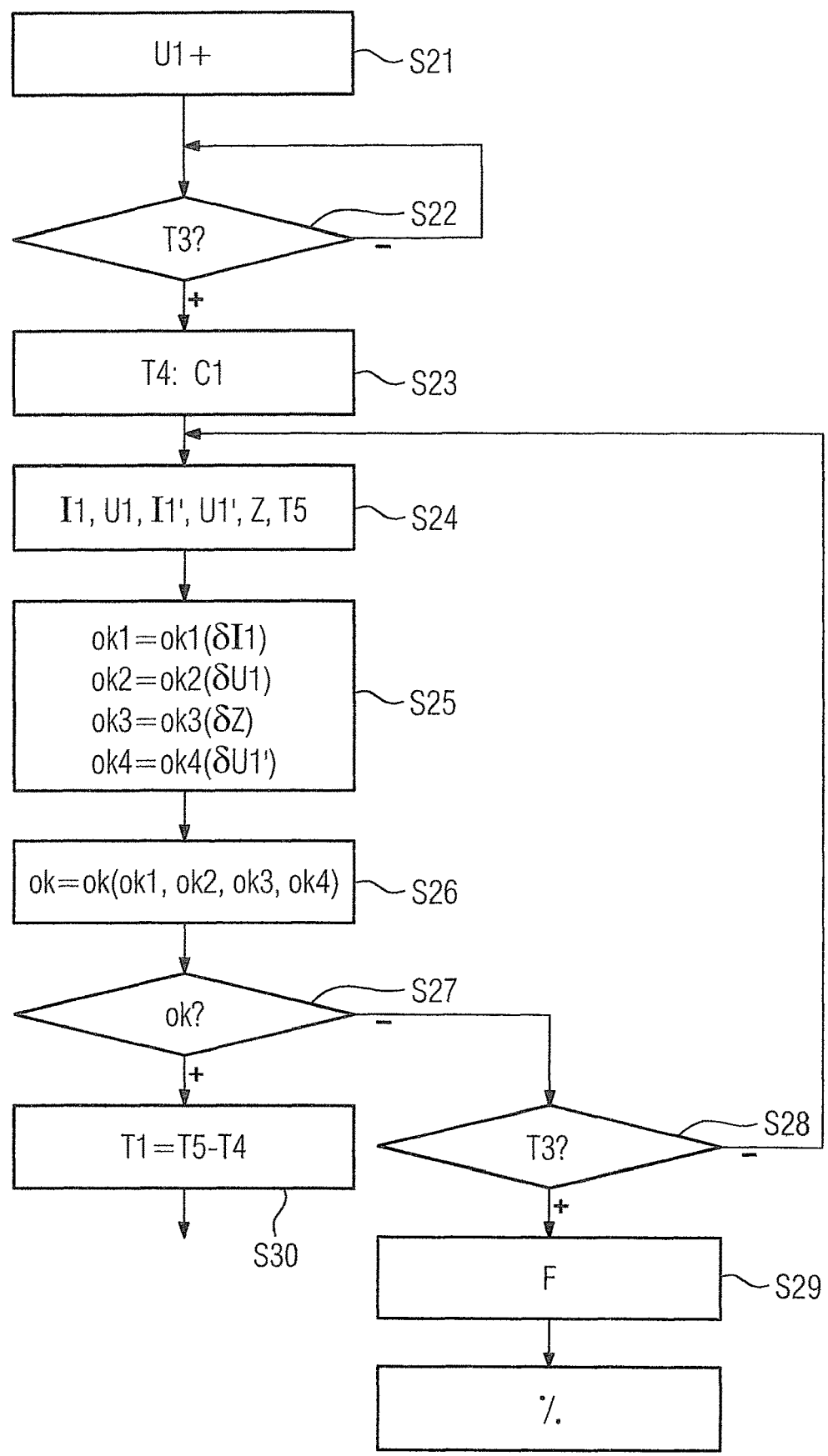
FIG. 5 shows a further flowchart in accordance with an embodiment of the invention.

FIG. 5 is a flowchart of the step associated with the calibration mode. As shown in FIG. 5, in calibration mode, the controller 7 initially supplies, in a step S21, the respective base voltage value U+ to the respective terminal 8 via the respective switching device 15. The controller 7 maintains this state for a maximum time T3. In particular, the controller 7 continuously checks in a step S22 whether the maximum time T3 has elapsed. The maximum time T3 is usually in the region of some few seconds, in particular most generally less than three seconds. Steps S21 and S22 initially serve to reliably establish a stable state, as should also prevail in normal mode, for the corresponding actuator 6 or the corresponding sensor 4.

As soon as the maximum time T3 has elapsed, in calibration mode, the controller 7 drives the respective switching device 15 in a step S23. For example, if the respective switching device 15 is closed in normal mode, then the controller 7 can drive the respective switching device 15 in step S23 such that it is opened. In terms of content, step S23 corresponds to step S11 of FIG. 4. The point in time at which the controller 7 changes over to step S23 corresponds to a start time T4.

In a step S24, the controller 7 acquires the corresponding measured values I1, I1', U1 and/or U1' via acquisition devices 9, 10, 13 and/or 14. The controller 7 optionally also acquires the respective state Z. On this basis, the controller 7 checks in steps S25 to S27 whether an expected change has occurred due to the modification of the respective supply potential U. Steps S25 and S26 correspond, with the current values of step S24 and in the comparison with the values valid prior to the performance of step S23, to steps S13 and S14 of FIG. 4. In step S24, the controller 7 additionally acquires the instantaneous point in time T5.

Providing the expected change has not (yet) occurred, the controller 7 checks in a step S28 whether, calculated from the performance of step S23, the maximum time T3 has elapsed. If this is not the case, then the controller 7 returns to step S24. Otherwise, the controller 7 moves on to a step S29. In step S29, the controller 7 outputs an error message F, preferably via the human-machine interface 17. If, on the other hand, the controller 7 establishes in step S27 that the expected change has occurred, then the controller 7 moves on to a step S30. The instantaneous point in time T5 acquired in the event of immediately preceding performance of step S24 simultaneously also corresponds in this case to a response time T5. In step S30, the controller 7 can therefore ascertain the valid time interval T1 using the start time T4 and the response time T5, such as by calculating the difference.

With the exception of the acquisition of the measured value U1' for the further potential U', it only being possible to implement this development on an actuator 6, the above-explained procedure can equally well be performed for an actuator 6 and a sensor 4.

The manner in which the cycle time T2 is defined was not explained in greater detail above. A fixed cycle time T2 may, for example, be predetermined. Alternatively, it may be predetermined for the controller 7 by the operator 18, for example, via the human-machine interface 17. Here, step S21 is preceded by a further step in which the cycle time T2 is predetermined. The cycle time T2 may in this case be individually predetermined as required for each sensor 4 and each actuator 6 or for groups of a plurality of sensors 4 and/or a plurality of actuators 6 or uniformly for all sensors 4 and/or actuators 6.

Similarly, setting of the base voltage value U+ and of the modified voltage value U− were not explained in greater detail above. It is possible to predetermine a fixed base voltage value U+ and fixed modified voltage value U− for the controller 7. In general, however, they are defined by the operator 18, specifically individually for the respective actuator 6 or sensor 4. They may in particular be defined in that one of two possible values is selected for the base voltage value U+ and the respective other value is selected for the modified voltage value U−. Other options for predetermination are also possible, however.

Figure 6:
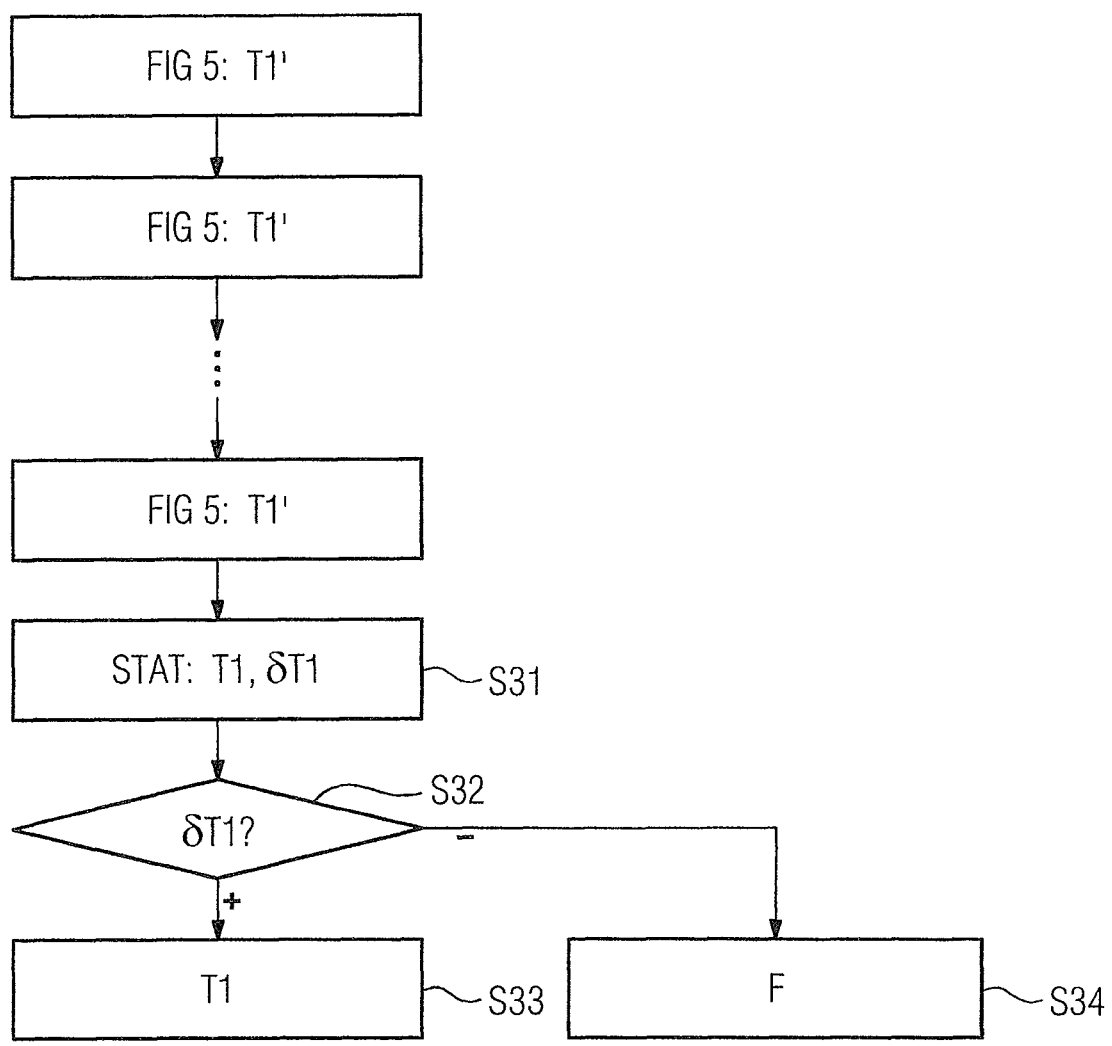
FIG. 6 shows a further flowchart of the method and in accordance with an embodiment of the invention.

The procedure explained above with reference to FIG. 5 may be still further improved, as shown in FIG. 6, by the controller 7 repeatedly performing the procedure of FIG. 5. In particular, the controller 7 thus, in relation to the respective actuator 6 or the respective sensor 4, in each case repeatedly supplies the base voltage value U+, modifies the supply potential U and acquires the start time T4 and the response time T5. The controller 7 in each case ascertains the associated time interval each time the procedure is performed. For the purposes of the development according to FIG. 6, however, the respective ascertained time interval is only provisional. In FIG. 6, it is therefore provided not with reference sign T1, but instead with reference sign T1'.

Because the provisional time intervals T1' are ascertained repeatedly, the controller 7 can perform a statistical evaluation of the provisional time intervals T1' in a step S31. In particular, based on the statistical evaluation in step S31, the controller 7 may ascertain the time interval T1 as a minimum, a maximum, a mean or a median of the provisional time intervals T1'. The controller 7 may furthermore check in a step S32 whether a scatter δT1 of the provisional time intervals T1' meets a predetermined condition. For example, the controller 7 may check whether the absolute scatter or the relative scatter related to the mean of the provisional time intervals T1' remains below a predetermined limit value. Only if the predetermined condition is met is the time interval T1 ascertained in step S31 determined, in a step S33, to be a valid time interval T1. Otherwise, in a step S34, the controller 7 may output a message to a higher-level control device, such as the central unit 2, and/or to the operator 18 via the human-machine interface 17. The message may be identical to the error message F.

To summarize, the present invention thus relates to the following substantive matter:

A peripheral module 3 of a programmable controller outputs via a terminal 8 a supply potential U and, in this respect, a supply current I to a field unit 4, 6. In a normal mode, the supply potential U has a base voltage value U+ and the supply current I a base current value I0. The peripheral module 3 changes over from time to time from normal mode into a test mode, in which it changes the supply potential U from the base voltage value U+ to a modified voltage value U− by driving a switching device 15 that is upstream of the terminal 8 for a defined time interval T1, checks whether an expected change has occurred thereafter and, depending on the result, changes back over into normal mode or changes over to alarm mode. In alarm mode, the peripheral module 3 outputs alarm message M' to a central unit 2 of the programmable controller and transfers actuators 6 connected to the peripheral module 3 into a safe state. During commissioning, the peripheral module 3 initially changes over prior to normal mode into a calibration mode, in which it initially supplies the base voltage value U+ to the terminal 8 via the switching device 15 and then, at a start time T4, changes the supply potential U to the modified value U−. It acquires a response time T5, at which the expected change occurs, and, using the start time T4 and the response time T5, ascertains the valid time interval T1.

The present invention has many advantages. In particular, it is straightforwardly possible to ascertain optimized time intervals T1 in fail-safe peripheral modules 3, in which the switching devices 15, the power supplies 16 and the connected actuators 6 and sensors 4 have to be repeatedly checked.

Although the invention has been illustrated and described in greater detail with reference to the preferred exemplary embodiment, the invention is not restricted by the disclosed examples and other variations may be derived therefrom by a person skilled in the art without going beyond the scope of protection of the invention.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An operating method for a peripheral module of a programmable controller, the peripheral module outputting, via a terminal of the peripheral module, a supply potential and, in this respect, an associated supply current to a field unit connected to the peripheral module, in a normal mode, the supply potential having a base voltage value and, in this respect, the supply current having a base current value, the peripheral module changing over from time-to-time from normal mode into a test mode, during which the peripheral module:
  changes the supply potential from the base voltage value to a modified voltage value by driving a switching device which is upstream of the terminal within the peripheral module for a defined valid time interval,
  checks whether, after the defined time interval has elapsed, an expected change has occurred due to the modification of the supply potential,
  changes back to normal mode if the expected change occurs and
  changes over to alarm mode if the expected change does not occur,
  wherein, in alarm mode, the peripheral module at least one of outputs an alarm message to a central unit of the programmable controller and (ii) transfers actuators connected to the peripheral module into a safe state via outputs of the peripheral module,
  wherein, during commissioning of the peripheral module, said peripheral module initially changes over prior to normal mode into a calibration mode, in calibration mode the method comprising:
  supplying, by the peripheral module, the base voltage value to the terminal via the switching device;
  changing, by the peripheral module, at a start time, the supply potential to the modified value and acquiring a response time at which the expected change occurs; and
  ascertaining, by the peripheral module, the valid time interval utilizing the start time and the response time.

2. The operating method as claimed in claim 1, wherein at least in test mode, at least one of the supply potential and the supply current are acquired; and wherein the expected change comprises a change in at least one of the supply potential and the supply current.

3. The operating method as claimed in claim 1, wherein, at least in test mode, the peripheral module receives a state of the field unit via a further terminal; and wherein the expected change is a change in the state of the field unit.

4. The operating method as claimed in claim 2, wherein the field unit comprises one of an actuator and a sensor.

5. The operating method as claimed in claim 3, wherein the field unit comprises one of an actuator and a sensor.

6. The operating method as claimed in claim 1, wherein the field unit comprises an actuator;
wherein the peripheral module outputs a further supply potential to the field unit via a further terminal of the peripheral module, such that the supply current output to the field unit is returned to the peripheral module from the field unit via the further terminal; and
wherein the expected change is a change in the further supply potential.

7. The operating method as claimed in claim 1, wherein, in calibration mode, the peripheral module in each case repeatedly supplies the base voltage value, modifies the supply potential and acquires the start time and response time, in each case, ascertains a provisional time interval and ascertains the valid time interval by statistical evaluation of the provisional time intervals.

8. The operating method as claimed in claim 7, wherein the peripheral module only determines the valid time interval to be valid if a scatter of the provisional time intervals meets a predetermined condition and otherwise outputs a message to at least one of a higher-level control device and an operator.

9. A peripheral module of a programmable controller, comprising:
a terminal, via which the peripheral module outputs a supply potential and, in this respect, an associated supply current to a field unit connected to the peripheral module;
a controller which operates the peripheral module at least in a normal mode, a test mode, an alarm mode and a calibration mode, said controller operating the peripheral module such that, in normal mode, the supply potential has a base voltage value and, in this respect, the supply current has a base current value, said controller transferring the peripheral module from time-to-time from normal mode into test mode,
wherein, in test mode, the controller:
changes the supply potential (U) from the base voltage value to a modified voltage value by driving a switching device which is upstream of the terminal within the peripheral module for a defined valid time interval,
checks whether, after the defined time interval has elapsed, an expected change has occurred due to the modification of the supply potential,
changes back over into normal mode if the expected change occurs, and transfers the peripheral module into alarm mode if the expected change does not occur;
wherein, in alarm mode, the controller at least one of (i) outputs an alarm message to a central unit of the programmable controller and (ii) transfers actuators connected to the peripheral module into a safe state via outputs of the peripheral module;
wherein, during commissioning of the peripheral module, the controller initially operates the peripheral module in calibration mode prior to normal mode;
wherein, in calibration mode, the controller:
initially supplies the base voltage value to the terminal via the switching device,
at a start time, then changes the supply potential to the modified value and acquires a response time at which the expected change occurs, and
ascertains the valid time interval utilizing the start time and the response time.

10. The peripheral module as claimed in claim 9, wherein, at least in test mode, the controller acquires at least one of (i) the supply potential and (ii) the supply current; and wherein the expected change is a change in at least one of (i) the supply potential and (ii) the supply current.

11. The peripheral module as claimed in claim 9, wherein, at least in test mode, the peripheral module receives a state of the field unit via a further terminal; wherein the expected change comprises a change in a state of the field unit.

12. The peripheral module as claimed in claim 10, wherein the field unit comprises one of an actuator and a sensor.

13. The peripheral module as claimed in claim 11, wherein the field unit comprises one of an actuator and a sensor.

14. The peripheral module as claimed in claim 9, wherein the field unit comprises an actuator;
wherein the peripheral module includes a further terminal, via which the peripheral module outputs a further supply potential to the field unit, such that the supply current output to the field unit is returned to the peripheral module from the field unit via the further terminal; and
wherein the expected change comprises a change in the further supply potential.

15. The peripheral module as claimed in claim 9, wherein, in calibration mode, the controller in each case repeatedly supplies the base voltage value, modifies the supply potential and acquires the start time and response time, in each case ascertains a provisional time interval and ascertains the valid time interval by statistical evaluation of the provisional time intervals.

16. The peripheral module as claimed in claim 9, wherein the controller only determines the valid time interval to be valid if a scatter of the provisional time intervals meets a predetermined condition and otherwise outputs a message to at least one of (i) a higher-level control device and (ii) an operator.

* * * * *